UNITED STATES PATENT OFFICE.

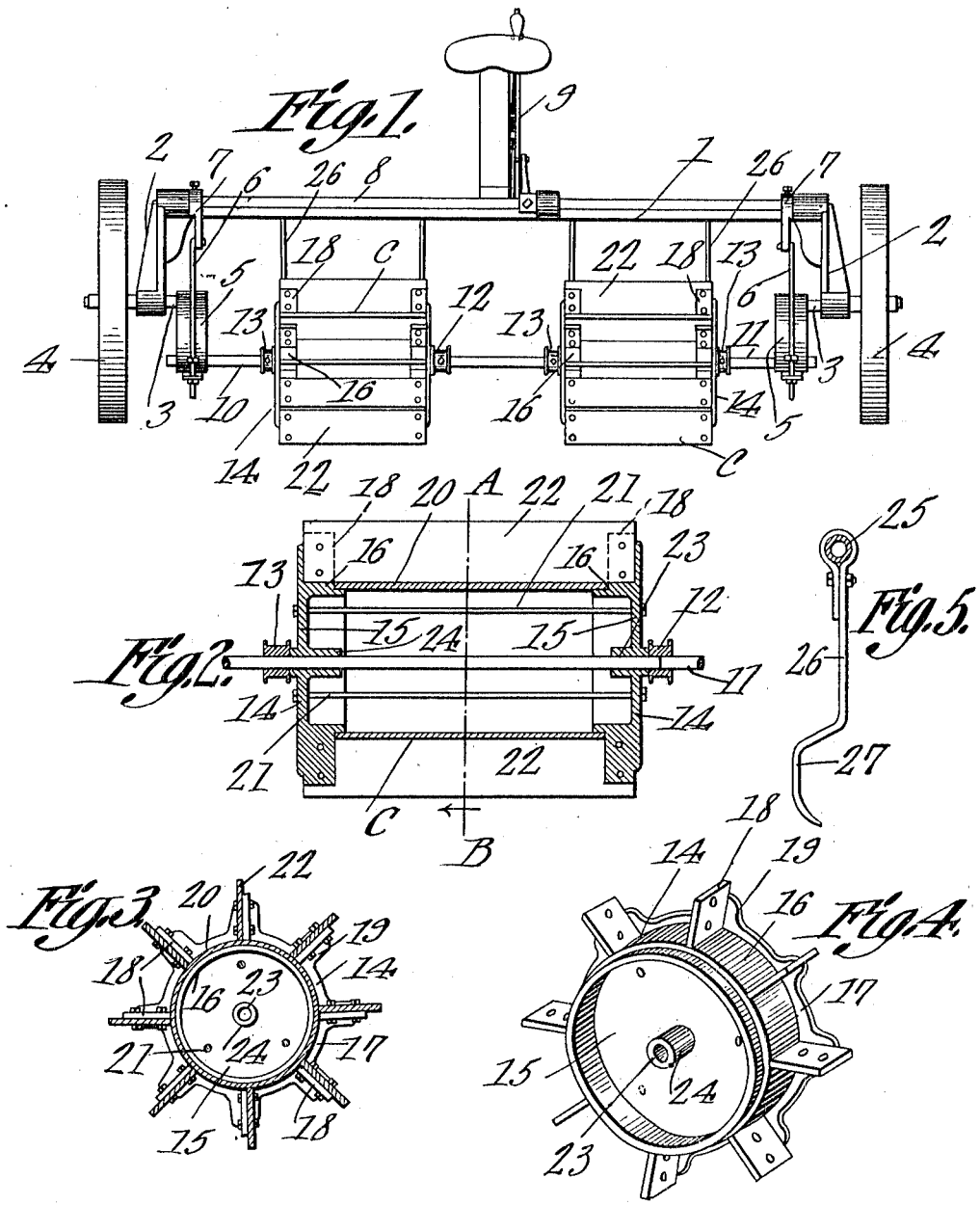

MARSHALL LEE ADAMS, OF GOLDSBORO, NORTH CAROLINA.

STALK-CUTTER.

1,105,949.

Specification of Letters Patent.

Patented Aug. 4, 1914.

Application filed October 16, 1913. Serial No. 795,533.

*To all whom it may concern:*

Be it known that I, MARSHALL L. ADAMS, a citizen of the United States, residing at Goldsboro, in the county of Wayne and State of North Carolina, have invented a new and useful Stalk-Cutter, of which the following is a specification.

This invention relates to stalk choppers of that type utilizing a chopping or cutting cylinder adapted to roll over the ground and chop the stalks in the path thereof.

One of the objects of the invention is to provide a stalk cutter having a novel form of cutting or chopping cylinder the parts of which are so arranged as to prevent choking or clogging and to enable them to be readily assembled or taken apart.

Another object is to provide a cutting or chopping means which can be adjusted upwardly and downwardly so as to bear with any desired degree of pressure upon the stalks resting on the ground.

Another object is to provide means whereby either one or two separate cutting units can be used, it being possible to adjust these units toward or from each other and it also being possible to readily remove either of the units from the shaft on which it rotates.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a machine having two cutting elements thereon such as constitute the present invention. Fig. 2 is an enlarged longitudinal section through one of the cutting elements. Fig. 3 is a section on line A—B Fig. 2. Fig. 4 is a perspective view of one of the heads of a cutting unit. Fig. 5 is a side view of one of the gathering teeth and its supporting bar.

Referring to the figures by characters of reference 1 designates a portion of the frame of the machine having hangers 2 at the sides thereof in which are journaled spindles 3 supported by wheels 4. Crank arms 5 extend from the spindles and these crank arms are connected by links 6, to crank arms 7 secured to a transverse shaft 8, journaled on frame 1. Said transverse shaft is adapted to be rotated by a lever 9 which may be connected to shaft 8 in any suitable manner. By referring to Fig. 1, it will be seen that each link 6 is adjustably connected to the crank arm 5 thereunder.

Secured within the crank arms 5 are alining shaft sections 10 and 11 held together by a coupling 12. Arranged on each of these shaft sections is a cutting unit, there being suitably arranged collars 13 on the shaft sections whereby the cutting units, indicated generally at C, are held against longitudinal movement on the shaft sections. However, by loosening the collars, these cutting units can be shifted longitudinally along and removed from the shaft sections as hereinafter set forth.

As shown in Figs. 2 to 4 inclusive, each cutting unit consists of two oppositely disposed similar heads 14 each consisting of an end plate 15 having a circular flange 16 on one face thereof, the free edge of the flange being formed with an exterior rabbet 17. Blades 18 radiate from the flange and the plate 15 has its marginal portion extended outwardly beyond the flange and provided with reinforcing webs or projections 19 formed integral with the blades 18. The rabbeted portions of the two heads project into and engage the end portions of a cylinder 20 and tie bolts 21 extend through the heads so that by tightening the bolts said heads can be caused to bind tightly against the ends of the cylinder. Cutting blades 22 extend along the outer surface of the cylinder and the ends of these blades are bolted or otherwise secured to the blades 18. Thus it will be seen that each cutting unit includes a plurality of cutting blades and that each blade can be removed independently of the other blade. Furthermore, as a relatively large cylinder 20 constitutes the core of the cutting element, it will be apparent that there is no danger of material packing between the cutting blades and thus rendering the structure ineffective.

Central openings 23 are formed in the heads of each cutting unit and one of the shaft sections 10 or 11 is adapted to be seated in the heads of each unit. These heads have bosses 24 in which the openings 23 are formed, said bosses providing broad bearings for the shaft sections.

Obviously when the machine is drawn forward so that the cutting elements will travel over rows of stalks, the blades 22 will cut through the stalks, the degree of pressure being regulated by raising or lowering the cutting element. This adjustment can be effected by means of lever 9. By shifting the lever 9 in one direction, shaft 8 can be rotated so as to swing arms 7 and 5 upwardly, whereas when the lever is moved in the other direction, said arms are moved downwardly, producing a corresponding downward movement of the cutting units.

Should it be desired to use but a single cutting unit, coupling 13 can be disengaged from one of the sections, the two shaft sections thus being separately removable if so desired. The cutting unit can be removed from either section and the two shafts then coupled together as before.

In order that the stalks may be gathered into the paths of the cutting elements, a cross bar 25 is supported in any suitable manner in front of the frame 1 and adjustably mounted on this bar are fingers 26 the upper ends of which are clamped about the bar 25 while the lower ends are bowed, as shown at 27 with their points extended forwardly. By loosening the upper ends of the teeth upon the bar 25, they can be adjusted toward or from each other so as thus to be brought to any desired positions relative to the cutting elements. When the machine is drawn forward these fingers will engage the stalks and drag them into the paths of the cutting elements, as will be obvious.

What is claimed is:—

1. A stalk cutter including a shaft, opposed heads thereon, each head having a circular flange, a cylinder interposed between the heads and engaged at its ends by the respective flanges, means extending through the cylinder and the heads and parallel with the shaft for binding the heads upon the cylinder, blades upon the heads, and cutting blades mounted at their ends on said blades on the heads, and separate means for detachably securing the respective cutting blades to the blades on the heads.

2. A stalk cutter including opposed similar heads, each head including a plate, a circular flange upon one face of the plate and formed with a rabbeted free edge, blades outstanding from the flange, and reinforcing webs formed by the plate and integral with the blades, a cylinder interposed between the heads and having its ends engaged by the rabbeted portions of the flanges, means extending longitudinally through the cylinder and secured to the heads for binding the heads against the cylinder, and cutting blades detachably secured at their ends to the blades on the heads.

In testimony that I claim the foregoing as my own, I have hereto affixed my signature in the presence of two witnesses.

MARSHALL LEE ADAMS.

Witnesses:
D. H. BLAND,
L. H. REEVER.

---

Copies of this patent may be obtained for five cents each, by addressing the "Commissioner of Patents, Washington, D. C."